United States Patent
Cen

(10) Patent No.: US 8,972,773 B2
(45) Date of Patent: Mar. 3, 2015

(54) CACHE DATA PROCESSING USING CACHE CLUSTER WITH CONFIGURABLE MODES

(75) Inventor: Wenchu Cen, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 0 days.

(21) Appl. No.: 12/800,691

(22) Filed: May 19, 2010

(65) Prior Publication Data

US 2010/0299553 A1    Nov. 25, 2010

(30) Foreign Application Priority Data

May 25, 2009   (CN) .......................... 2009 1 0143736

(51) Int. Cl.
 G06F 11/00    (2006.01)
 H04L 29/08    (2006.01)
 H04L 29/14    (2006.01)

(52) U.S. Cl.
 CPC .......... H04L 29/08729 (2013.01); H04L 69/40 (2013.01)
 USPC .......................................................... 714/6.1

(58) Field of Classification Search
 USPC .......................................................... 714/6.1
 See application file for complete search history.

(56) References Cited

U.S. PATENT DOCUMENTS

| 5,896,506 | A |   | 4/1999  | Ali et al. |
|---|---|---|---|---|
| 5,951,695 | A |   | 9/1999  | Kolovson |
| 6,038,641 | A | * | 3/2000  | Zangenehpour ............... 711/119 |
| 6,122,629 | A | * | 9/2000  | Walker et al. .................. 707/613 |
| 6,243,795 | B1 |   | 6/2001  | Yang et al. |
| 6,601,187 | B1 |   | 7/2003  | Sicola et al. |
| 6,757,790 | B2 |   | 6/2004  | Chalmer et al. |
| 6,782,492 | B1 |   | 8/2004  | Nakaso |
| 6,970,972 | B2 | * | 11/2005 | Hosoya ......................... 711/113 |
| 7,114,083 | B2 | * | 9/2006  | Devine et al. ................. 713/152 |
| 7,120,690 | B1 | * | 10/2006 | Krishnan et al. .............. 709/225 |
| 7,395,390 | B2 |   | 7/2008  | Chen |
| 7,461,130 | B1 | * | 12/2008 | AbdelAziz et al. ........... 709/208 |

(Continued)

FOREIGN PATENT DOCUMENTS

| CN | 1492348 A | 4/2004 |
|---|---|---|
| CN | 1567237 A | 1/2005 |

(Continued)

OTHER PUBLICATIONS

Deborah Steiner and Kurt Heiss, Oracle Fusion Middleware Administrator's Guide for Oracle Web Cache, Oct. 2009, 11gRelease 1(11.1.1) E10143-02.*

Primary Examiner — Amine Riad
(74) Attorney, Agent, or Firm — Van Pelt, Yi & James LLP

(57) ABSTRACT

Processing cache data includes sending a cache processing request to a master cache service node in a cache cluster that includes a plurality of cache service nodes, the cache cluster being configurable in an active cluster configuration mode wherein the plurality of cache service nodes are all in working state and a master cache service node is selected among the plurality of cache service nodes, or in a standby cluster configuration mode, wherein the master cache service node is the only node among the plurality of cache service nodes that is in working state. It further includes waiting for a response from the master cache service node, determining whether the master cache service node has failed; and in the event that the master cache service node has failed, selecting a backup cache service node.

16 Claims, 14 Drawing Sheets

(56) References Cited

U.S. PATENT DOCUMENTS

| | | | |
|---|---|---|---|
| 7,461,147 B1 * | 12/2008 | Mowat et al. | 709/225 |
| 7,870,258 B2 * | 1/2011 | Sundaresan et al. | 709/227 |
| 7,890,701 B2 * | 2/2011 | Lowery et al. | 711/130 |
| 7,921,325 B2 | 4/2011 | Kondo et al. | |
| 8,161,244 B2 * | 4/2012 | Krishnaprasad et al. | 711/136 |
| 8,370,649 B2 * | 2/2013 | Sherer et al. | 713/193 |
| 8,726,264 B1 * | 5/2014 | Allen et al. | 717/168 |
| 2002/0120887 A1 | 8/2002 | Hughes et al. | |
| 2006/0248212 A1 * | 11/2006 | Sherer et al. | 709/231 |
| 2006/0248213 A1 * | 11/2006 | Sherer et al. | 709/231 |
| 2007/0101186 A1 | 5/2007 | Chen | |
| 2007/0260939 A1 | 11/2007 | Kammann et al. | |
| 2008/0091895 A1 | 4/2008 | Chen | |
| 2008/0172679 A1 * | 7/2008 | Shen et al. | 719/318 |
| 2010/0293332 A1 * | 11/2010 | Krishnaprasad et al. | 711/119 |
| 2010/0293334 A1 * | 11/2010 | Xun et al. | 711/129 |
| 2010/0293338 A1 * | 11/2010 | Krishnaprasad et al. | 711/136 |
| 2011/0225358 A1 * | 9/2011 | Kaneko | 711/113 |
| 2011/0228668 A1 * | 9/2011 | Pillai et al. | 370/217 |
| 2012/0005154 A1 * | 1/2012 | George et al. | 707/607 |
| 2012/0096103 A1 * | 4/2012 | Xun et al. | 709/206 |
| 2013/0179962 A1 * | 7/2013 | Arai et al. | 726/9 |
| 2014/0032853 A1 * | 1/2014 | Lih et al. | 711/141 |
| 2014/0082129 A1 * | 3/2014 | Beard et al. | 709/216 |

FOREIGN PATENT DOCUMENTS

| | | |
|---|---|---|
| JP | H0713792 | 1/1995 |
| JP | 2003022259 | 1/2003 |
| JP | 2007200103 | 8/2007 |
| JP | 2008217285 | 9/2008 |
| JP | 2009098715 | 5/2009 |

* cited by examiner

CACHE DATA PROCESSING USING CACHE CLUSTER WITH CONFIGURABLE MODES

CROSS-REFERENCE TO OTHER APPLICATIONS

This application claims priority to People's Republic of China Patent Application No. 200910143736.3 entitled METHOD, SYSTEM AND DEVICE FOR CACHE DATA PROCESSING filed May 25, 2009 which is incorporated herein by reference for all purposes.

FIELD OF THE PRESENT INVENTION

The present application relates generally to the field of network technology and more particularly cache data processing.

BACKGROUND OF THE INVENTION

Distributed cache refers to storing data in the memory of a distributed system. Distributing content to be cached on physically separated cache service nodes can achieve high availability, high performance, and scalability for event-driven applications. The event-driven third-party application may distribute an output event to various distributed caches, so high availability of results can be ensured. Many event-driven third-party applications need to combine stream data with external data, such as data retrieved from persistent storage. Caching may be used to improve the speed of accessing non-stream data and therefore improve the overall performance of the applications. Thus, caching is widely used in Internet-based applications and large-scale website architecture design.

Presently, distributed caches typically include server distributed cache and client distributed cache. Data is distributed to a cache service node by a predetermined algorithm. If a cache service node behaves abnormally, all the data in the cache service node may be lost. Furthermore, the failure of a cache service node may cause interruption in normal service. Moreover, because data is distributed to a cache service node by a predetermined algorithm, once a cache service node starts to behave abnormally, further requests distributed to the cache service node will not be accepted.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
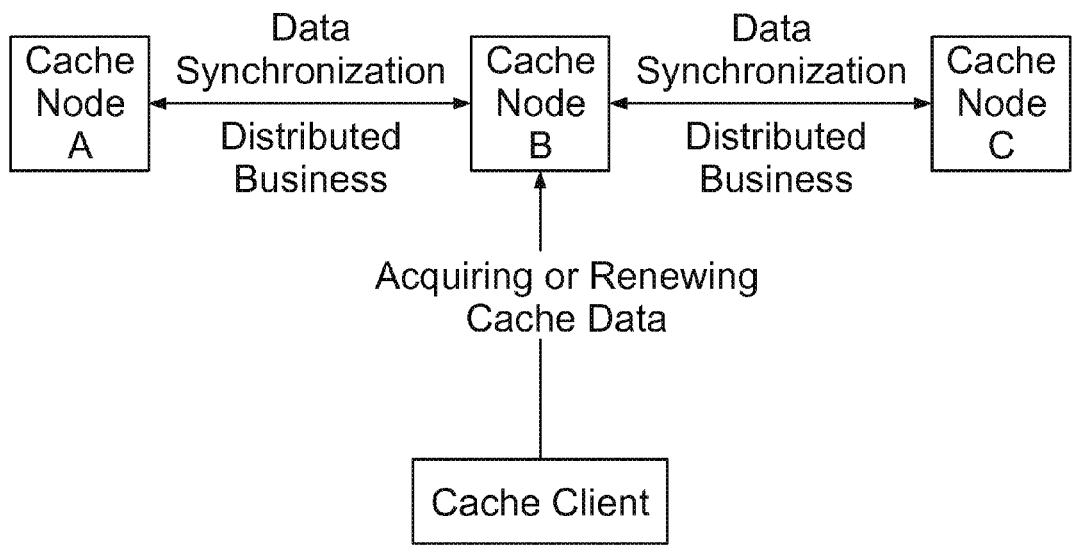
FIG. 1 is a diagram of illustrating a typical server distributed cache.

FIG. 1 is a diagram of illustrating a typical server distributed cache. The system includes a cache client, cache node A, cache node B, and cache node C. The distributed operation is performed by the server at cache node B. JGroups multicast communication is often used to implement the communication protocol among the nodes; operation and data synchronization are usually performed by a three stage business protocol. Representative systems of this type include JBoss Cache and EhCache. Since multicast communication is unreliable, and the three stage business protocol is highly complex, this setup is low in efficiency and is typically not suited for systems that must handle frequent and highly concurrent requests.

Figure 2:
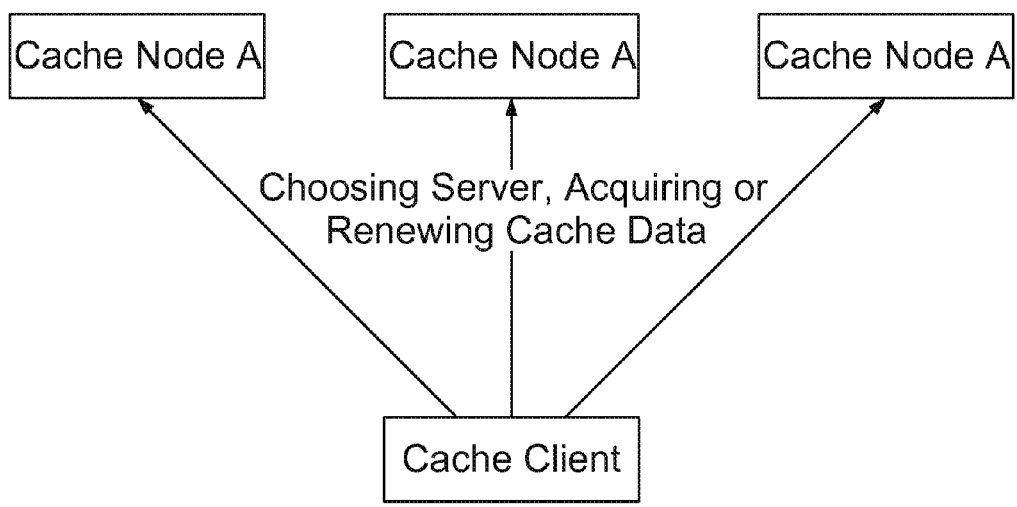
FIG. 2 is a structure diagram of a typical client distributed cache.

FIG. 2 is a structure diagram of a typical client distributed cache. The system includes a cache client, cache node A, cache node B, and cache node C. The cache server is a decentralized cache. Different keys can be distributed to different clients, thereby forming an extensible client distributed cache system. Representative systems of this type include Memcached system. This type of system has good extensibility and high efficiency, but lacks a fault-tolerant mechanism. When a portion of the data cache service node fails, the system will lose some data, which affects the normal usage of the business system. The open source Memcached DB developed by Sina Network guarantees data integrity by storing data in memory database or local hard disk, but is not able to achieve a high degree of fault tolerance or load balance under the environment of high concurrent requests.

In the embodiments discussed below, when a master cache service node failed to perform cache data processing, the cache client tags the master cache service node with failure, and chooses a backup cache service node and sends operation request to the backup cache service node. The application provides a method for cache data processing, applied in a network including multiple cache service nodes in a cluster, and solves the problems of cache service node unavailability and data loss as a result of cache service node failure.

Figure 12:
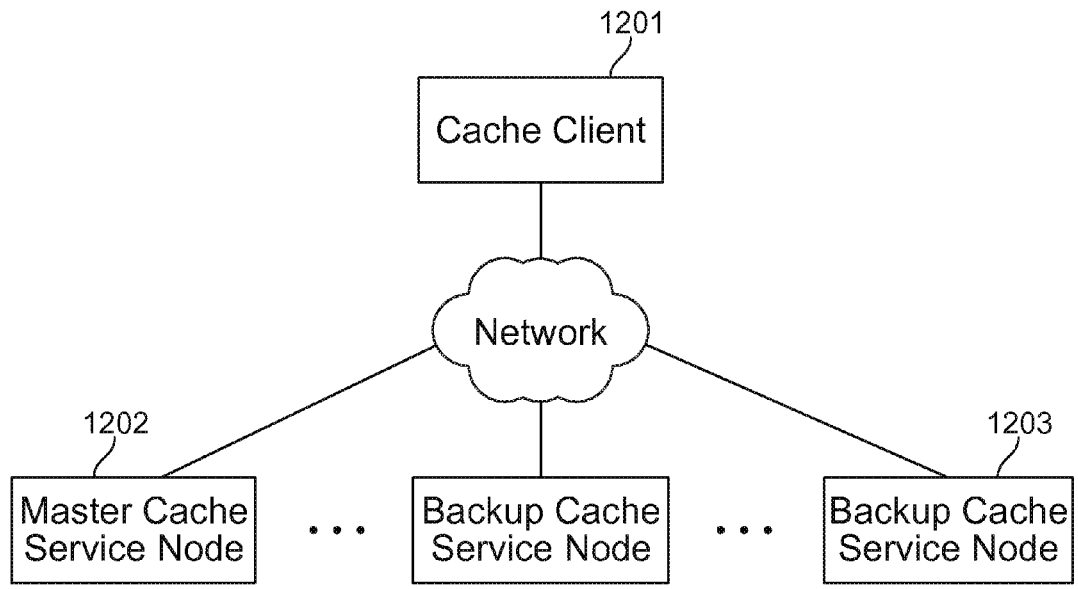
FIG. 12 is a block diagram illustrating an embodiment of a data caching system.

FIG. 12 is a block diagram illustrating an embodiment of a data caching system. The system includes a cache client 1201, a master cache service node 1202, and one or more backup cache service nodes 1203. The cache client may be implemented as a computer, a mobile device such as a smart phone, or any other appropriate device configured to send operation requests to master cache service node 1202 and to receive the results of the operation requests from master cache service node 1202, via a network. If the results indicate that the operation request from received master cache service node 1202 has failed, or if the request has timed out, the cache client is configured to choose a backup cache service node 1203 and redirect the operation requests to backup cache service node 1203. Master cache service node 1202 is configured to receive the request for cache data processing sent by cache client 1201 and return operation result to cache client 1201. Backup cache service node 1203, when master cache service node 1202 failed, receiving the request for cache data processing sent by cache client 1201.

The master cache service node and backup cache service nodes may be configured in active cluster configuration mode or standby cluster configuration mode. In active cluster configuration mode, multiple cache service nodes in cluster are in working state, and the master cache service node is selected each time a request needs to be processed. When a cache service node fails, other cache service nodes share the request. In standby cluster configuration mode, there is only one cache service node of the multiple cache service nodes in the cluster that acts as the master cache service node and is in working state. Other cache service nodes are in backup state. When the master cache service node fails, one of the other cache service nodes substitutes for the master cache service node as the new master cache service node, and processes requests. In addition, the cache service nodes are virtualized so that when the capacity of cache service nodes in the cluster is insufficient, the capacity of a node can be expanded dynamically.

Figure 3:
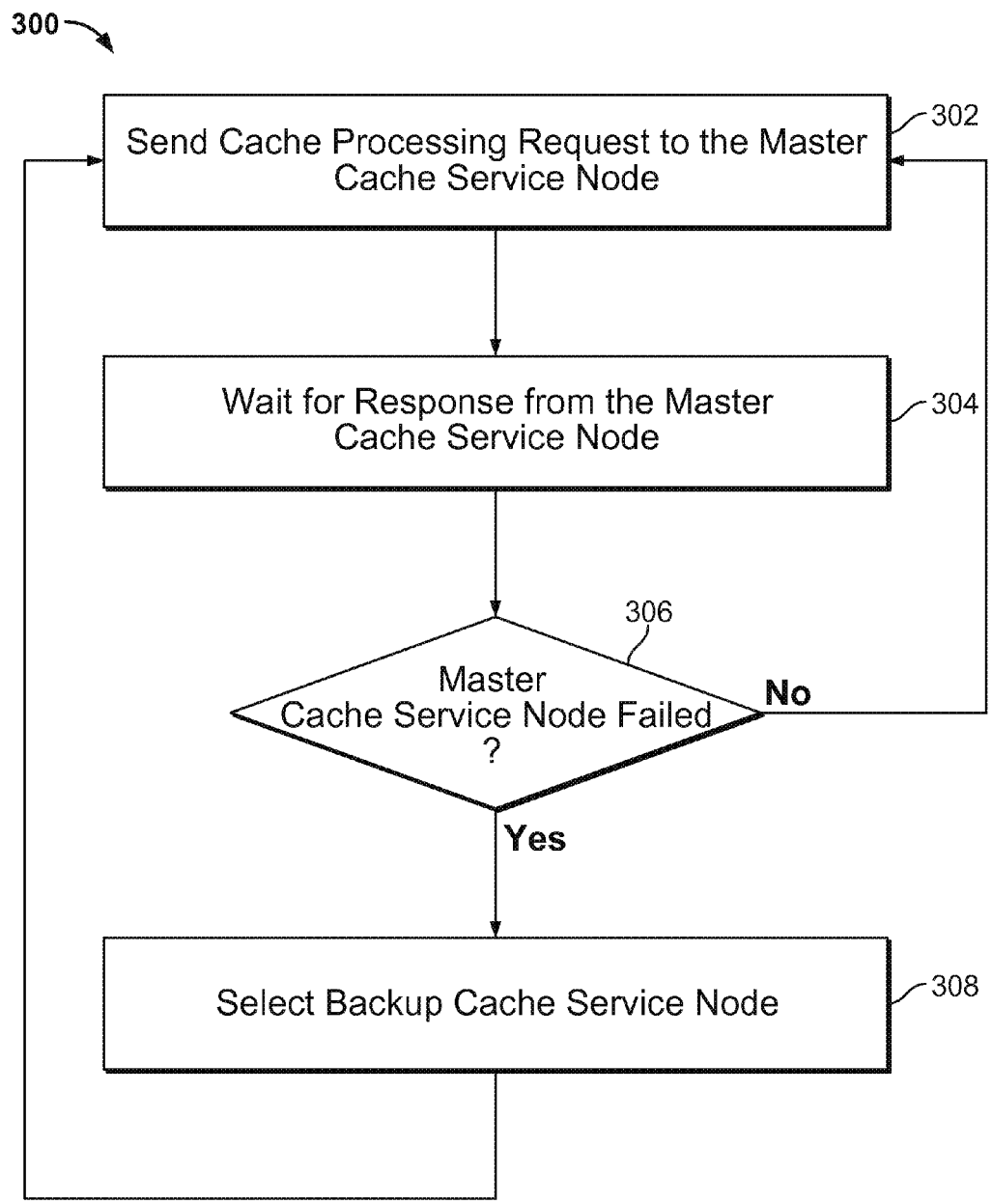
FIG. 3 is a flowchart illustrating an embodiment of a cache processing method.

FIG. 3 is a flowchart illustrating an embodiment of a cache processing method. Process 300 may be performed on a cache processing system such as 1200 of FIG. 12. At 302, the cache client sends a cache processing request to the master cache service node. At 304, the cache client waits for a response (i.e., the result of the cache processing request) from the master cache service node. At 306, it is determined whether the master cache service node failed to perform cache data processing. If the response received includes an error code, incorrect checksum, or the like or if the response times out, then it is determined that the master cache service node has failed. Thus, at 308, the cache client selects a backup cache service node as the new master cache service node and sends future cache processing requests to the backup cache service node. Otherwise, future cache processing requests continue to be directed to the same master cache service node.

In some embodiments, the cluster configuration modes include an active cluster configuration mode and a standby cluster configuration mode. In the active cluster configuration mode, multiple cache service nodes within the cluster are in working state and collectively process the requests and there is not necessarily a single master cache service node. When a cache service node fails, the other cache service nodes continue to share request processing. When the request is processed, data synchronization of the nodes in the cluster is performed. In the standby cluster configuration mode, only one cache service node of the multiple cache service nodes within the cluster is in working state and acting as the master cache service node, and other cache service nodes are all in backup state. When master cache service node fails, one of the backup cache service nodes is selected as the new master service node and will receive and process cache processing requests and periodically perform data synchronization of the nodes in cluster. The active cluster configuration mode and standby cluster configuration mode provide automatic fault recovery for the whole network and ensures uninterrupted data access by the cache client.

Figure 4:
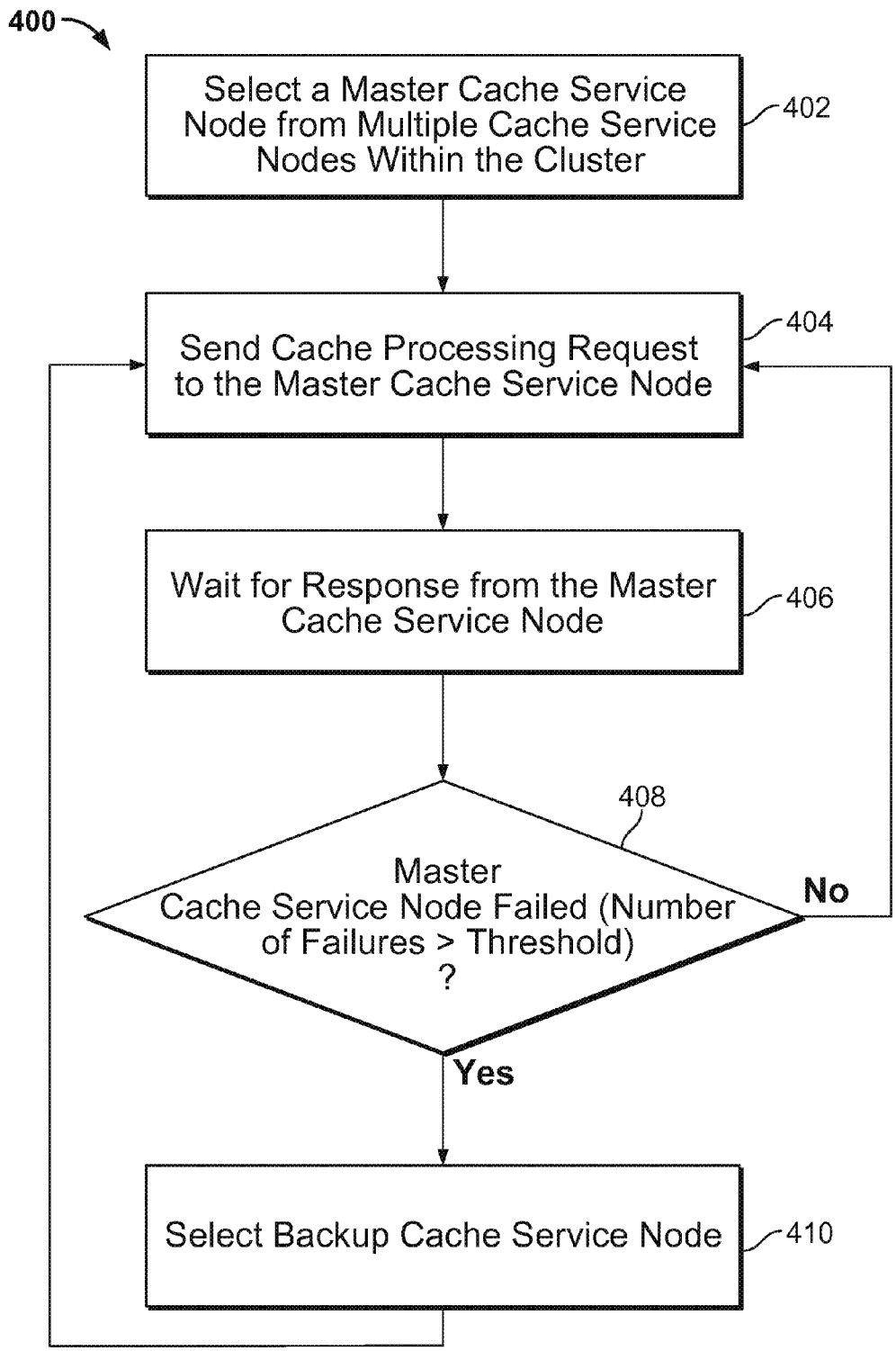
FIG. 4 is a flowchart illustrating an embodiment of a process for cache request processing when multiple cache service nodes within a cluster are in the active cluster configuration mode.

FIG. 4 is a flowchart illustrating an embodiment of a process for cache request processing when multiple cache service nodes within a cluster are in the active cluster configuration mode. The process may be performed on a cache client.

At 402, the cache client selects a master cache service node from multiple cache service nodes within the cluster either algorithmically or according to the client's configuration. If a cache service node in the cluster fails, the failed node maintains failure state. This information may be broadcasted to other cache service nodes or stored in a designated memory location on the network. The cache client acquires cache service nodes tagged with failure state by querying the cache service nodes or by retrieving the information from the designated location. In some embodiments, the cache client further acquires available cache service nodes on the network. The cache client selects one cache service node from the available cache service nodes as the new master cache service node. Examples of the selection technique include dynamic load distribution selection, hash, or consistent hash.

After selecting the master cache service node, the cache client sends a request for cache data processing to master cache service node, at 404.

At 406, the cache client waits for a response from the master cache service node. At 408, it is determined whether the master cache service node has failed to perform cache data processing. If the response indicates that the request was processed successfully, future cache processing requests continue to be directed to the same master cache service node, at 404.

If the response received includes an error code, incorrect checksum, or the like or if the response times out, then it is determined that the master cache service node has failed. In some embodiments, when the master cache service node has failed to perform cache data processing, the cache client increments the number of failed operations associated with the master cache service node. The number of failed operations is compared with a predetermined threshold. When the number of failed operations is greater than threshold, the master cache service node is marked with failure status. In some embodiments, a failure period is set for the failed node, during which the failed node is unavailable and has the opportunity to reset or recover and become available again.

If the master cache service node has failed, at 410, the cache client selects a backup cache service node as the new master cache service node, algorithmically or according to configuration, and sends future cache processing requests to the backup cache service node.

In some embodiments, the cache client implements asynchronous processing using a cluster operation task queue for maintaining tasks to be performed and a task execution thread pool for managing threads used to cause cluster cache service node to perform the operation. When a request operation is successful, the cache client caches the operation result and saves the operation and operation result in the cluster operation task queue. The task execution thread pool manages the thread used to send request to and receive response from the master cache service node and prevents other cache service nodes from processing the operation.

In the active cluster configuration mode, when master cache service node fails, a backup cache service node is selected to substitute for the failed master cache service node. When the failed master cache service node recovers, cluster operation task queue returns or copies the operation performed by the backup cache service node and the operation result to the master cache service node. Meanwhile, the master cache service node is in working state again, and the backup cache service node no longer acts as a substitute master cache service node. The asynchronous processing is also used for renewing the operation performed by the master cache service node to all other cache service nodes when master service node has not failed. In other words, in active cluster configuration mode, once the operation is in process, either master cache service node or backup cache service node saves the operation and operation result to cluster operation task queue and waits for performing data asynchronous processing to all other cache service nodes in cluster, which ensures that the consistency of data of all cache service nodes in the cluster.

When judging that the operation failed according to the operation result, cache client marks the backup cache service node with a failure indicator and re-selects backup cache service node.

Figure 5:
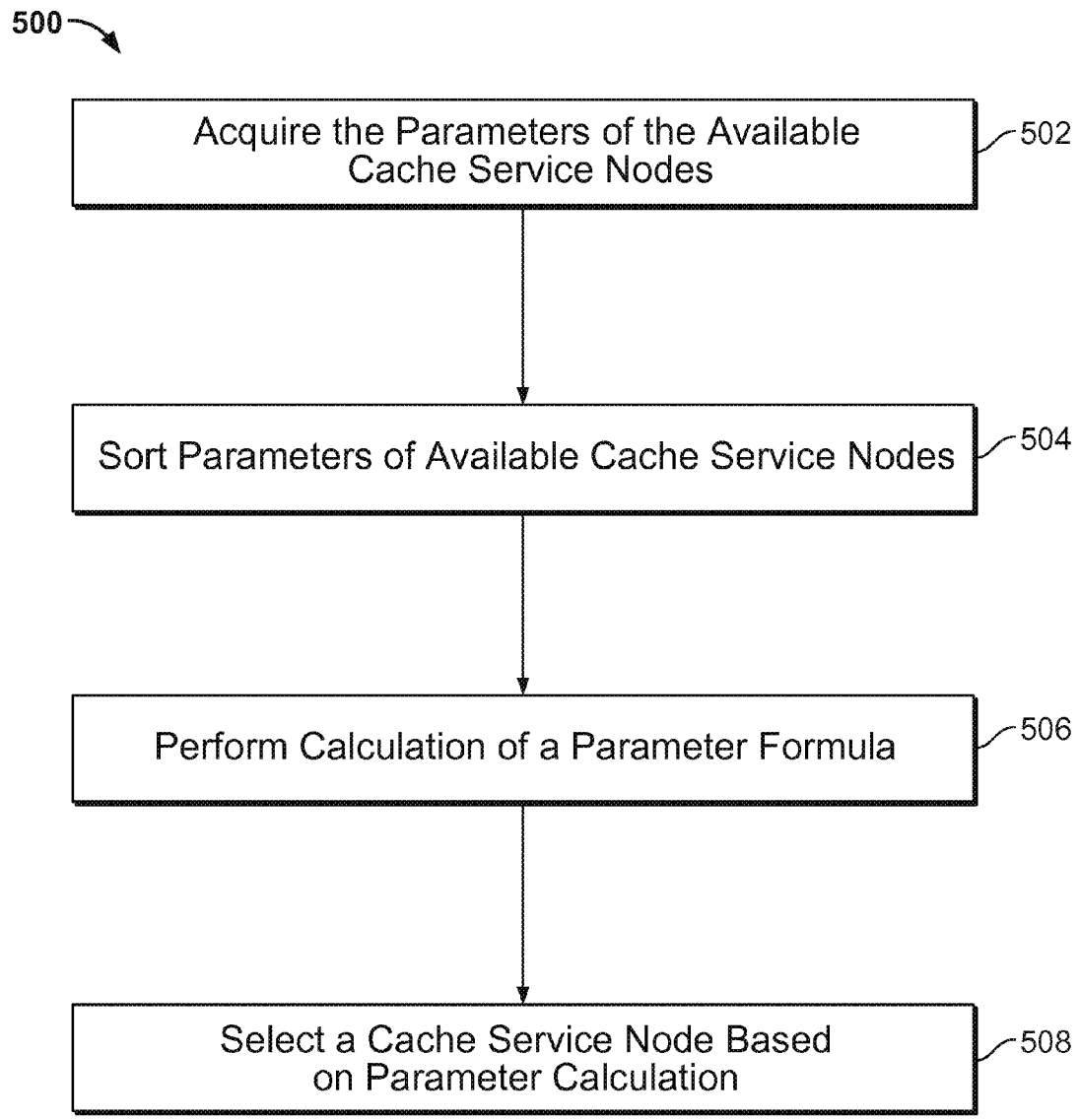
FIG. 5 is a flowchart illustrating an embodiment of a process for selecting the master cache service node.

In some embodiments, in step 402, the master cache service node is selected using a dynamical load distribution selection technique. FIG. 5 is a flowchart illustrating an embodiment of a process for selecting the master cache service node. The process may be performed by a cache client.

At 502, the cache client acquires the parameters of available cache service nodes by querying the cache service nodes. The parameters include processing capacity index $W[i]$ of cache service node, the present total cache data volume $C[i]$ of cache service node, and request response time $R[i]$ of cache service node.

At 504, the parameters of acquired available cache service nodes are sorted in ascending order or descending order. For example, $F(K[i], \{K[1] \ldots K[N]\}, ASC)$ indicates that array $\{K[1] \ldots K[N]\}$ is sorted in ascending order first and then returning to the location of the subscript of $K[i]$. Similarly, $F(K[i], \{K[1] \ldots K[N]\}, DESC)$ indicates that array $\{K[1] \ldots K[N]\}$ is sorted in descending order first and then returning to the location of the subscript of $K[i]$.

At 506, a parameter formula is computed. In some embodiments, a weighted formula for selecting the cache service node is as follows:

$Max(F(W[i], \{W[1] \ldots W[N]\}, ASC)*25\%+F(C[i], \{C[1] \ldots C[N]\}, DESC)*25\%+F(R[i], \{R[1] \ldots R[N]\}, DESC)*50\%)$.

According to the formula above, processing capacity accounts for 25 percent, where the processing capacity should be as great as possible; total cached content volume accounts for 25 percent, where the total cached content volume should be as low as possible; and the response time accounts for 50 percent, where the response time should be as short as possible.

At 508, the master cache service node is selected according to the calculation result. In the example, where the formula illustrated in step 506 is used, the cache service node with the maximum value is chosen.

Figure 6:
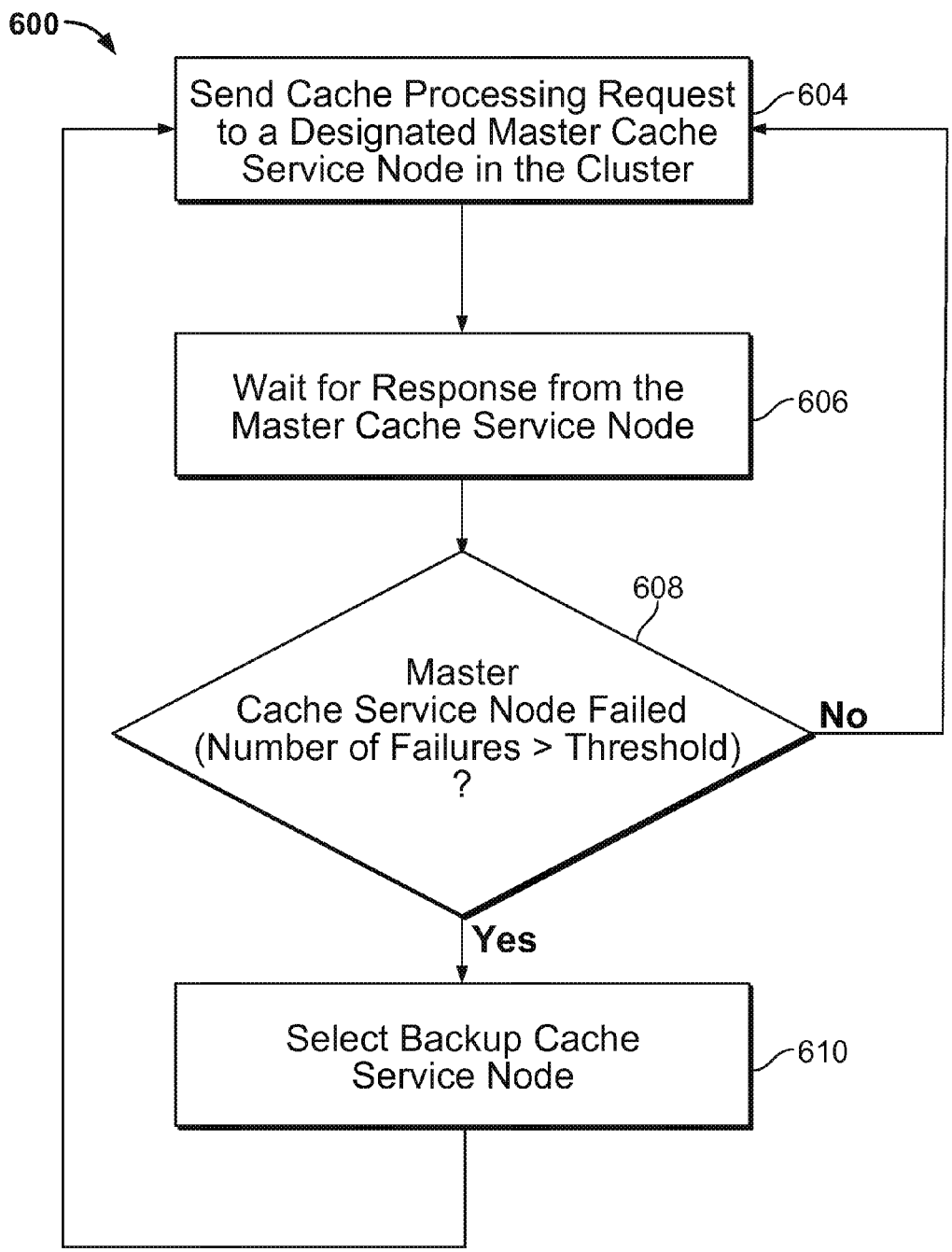
FIG. 6 is a flowchart illustrating an embodiment of a cache data processing process for a cache cluster in which cache service nodes are configured in a standby cluster configuration mode.

FIG. 6 is a flowchart illustrating an embodiment of a cache data processing process for a cache cluster in which cache service nodes are configured in a standby cluster configuration mode. Process 600 is similar to process 400, except that the client is not required to select a master cache service. Instead, a master cache service node in the cluster is already designated. In some embodiments, the cache service nodes in a cluster are removed or added to a sequence listing as they experience failure or recovery. Thus, the master cache service node is designated according to the position of the node in the sequence listing. In other words, cache service nodes are arranged in the order the cache service nodes are added to the sequence and the first one in the sequence is designated as the master cache service node. When the master cache service node fails, the next cache service node in the sequence becomes the new designated master cache service node, while the failed former master cache service node is removed from the sequence and added to the end of the sequence once it recovers.

Figure 7:
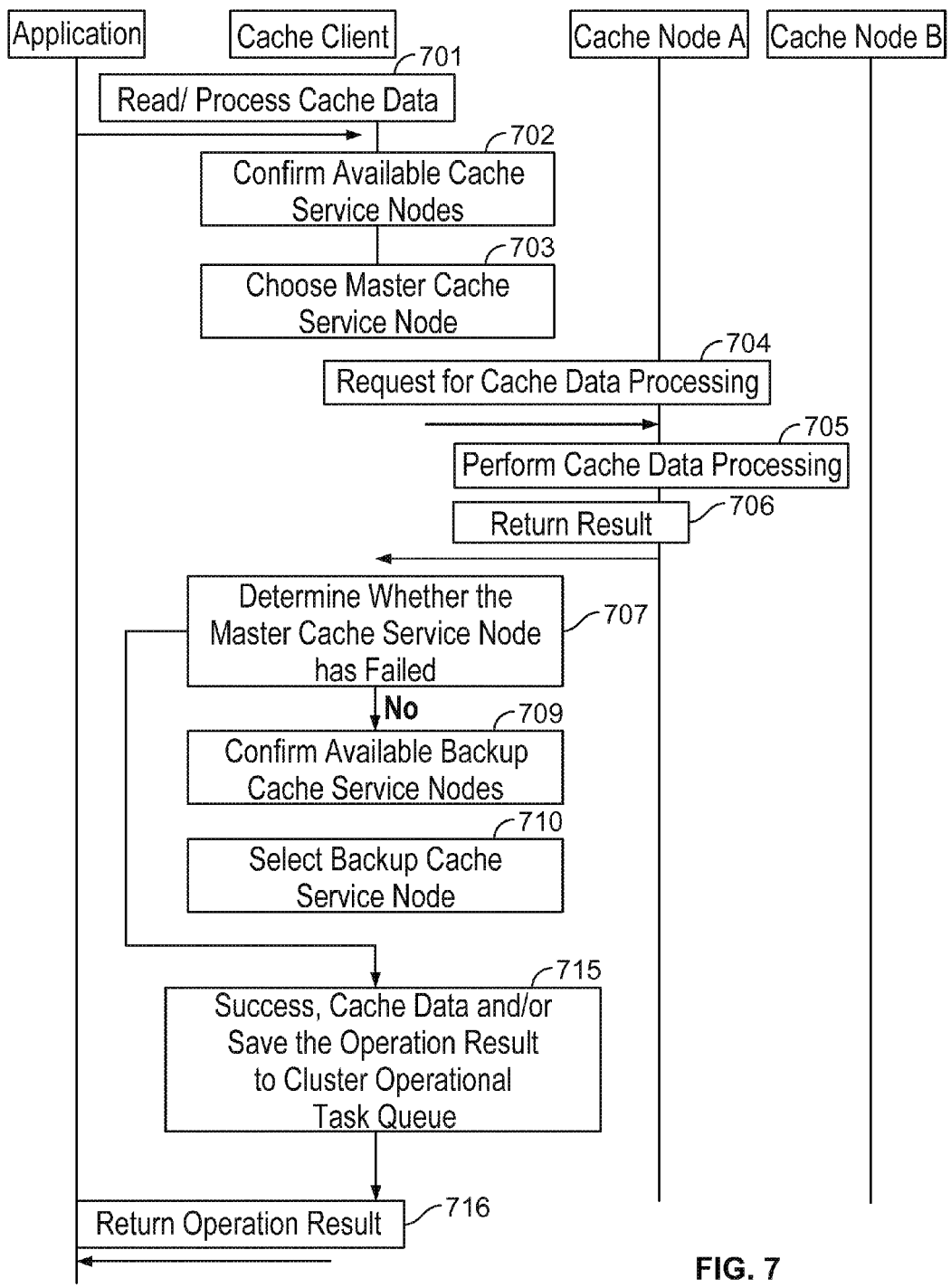
FIG. 7 is a flow diagram illustrating the messages and steps used in an embodiment of a cache data processing process in active configuration mode.

In some embodiments, the active cluster configuration mode is used in a system with high data security requirement and high reading to writing ratio. FIG. 7 is a flow diagram illustrating the messages and steps used in an embodiment of a cache data processing process in active configuration mode. In this example, the network includes an application (often a third-party application), cache client, and cache nodes A and B. Additional cache nodes may be used in other embodiments. When the third party application needs cache processing, i.e. the third-party application sends a request for cache data reading or cache data processing, and when cache node A, which is chosen by the cache client for performing cache data processing according to a dynamical load distribution technique, has failed, the cache client chooses cache node B for performing cache data processing. When cache node B performs cache data processing successfully, data asynchronous processing is performed.

In the example shown, at 701, the application sends the request for cache data reading or cache data processing to the cache client.

At 702, the cache client receives the request sent by the application, and confirms available cache service nodes. If a cache service node in cluster has failed, a failure tag becomes associated with the failed node and is saved. The cache client examines the states of all cache service nodes and then determines whether cache service nodes are available according to their failure tags. The cache client confirms that the cache service nodes without failure tags are available cache service nodes. When the cache client does not find any available cache service node, it sends error information to the third party application. When the cache client finds one or more available cache service nodes, it executes 703 by choosing a master cache service node, using a process similar to 500 of FIG. 5.

In this example, the cache client chooses cache node A as the master cache service node. At 704, the cache client sends request for cache data processing to cache node A. Alternatively, cache node B may be selected as the master cache service node and the processing steps described below are equally applicable.

At 705, cache node A receives the operation request sent by cache client and performs cache data processing. At 706, when cache node A completes the operation request, it returns operation result to cache client.

At 707, the cache client determines whether the master cache service node has failed according to returned operation result.

In addition to the failure of the cache node itself, there may be many other reasons (for example, bad network connection) that cause the operation to fail. Therefore; cache node A is not directly tagged as failed. Instead, a failure counter is associated with the cache node and the count is incremented each time the operation is deemed to have failed. A threshold N is set in the failure counter. When the number of failures recorded is greater than threshold N, the cache client tags the state of cache node A as having failed.

At 709, cache client receives a request sent by an application and confirms available backup cache service nodes.

Failure tags associated with failed cache service nodes are maintained by the cache client or are saved on the network. The cache client looks for available cache service nodes in the network that are not associated with failure tags. When the cache client failed to find an available cache service node, the cache client sends error information to the application. Otherwise, if available cache service nodes are found, at 710, the cache client chooses one cache service node as backup cache service node from available cache service nodes using an appropriate technique such as the dynamic load distribution technique, the Hash technique, or the consistent Hash technique.

At 715, the response from the master cache service node indicates that the operation is successful and the cache client saves the operation and the result to the cluster task queue. If the operation is an acquiring operation and new data needs to be cached, the data is cached and a validity period is associated with the data.

At 716, the cache client returns the result of its operation to the application.

After the step 716 in which cache client saves the operation and operation result to cluster operational task queue, asynchronous processing including asynchronous data recovery and asynchronous data copying can be realized by the combined use of task queue and thread pool.

Figure 8:
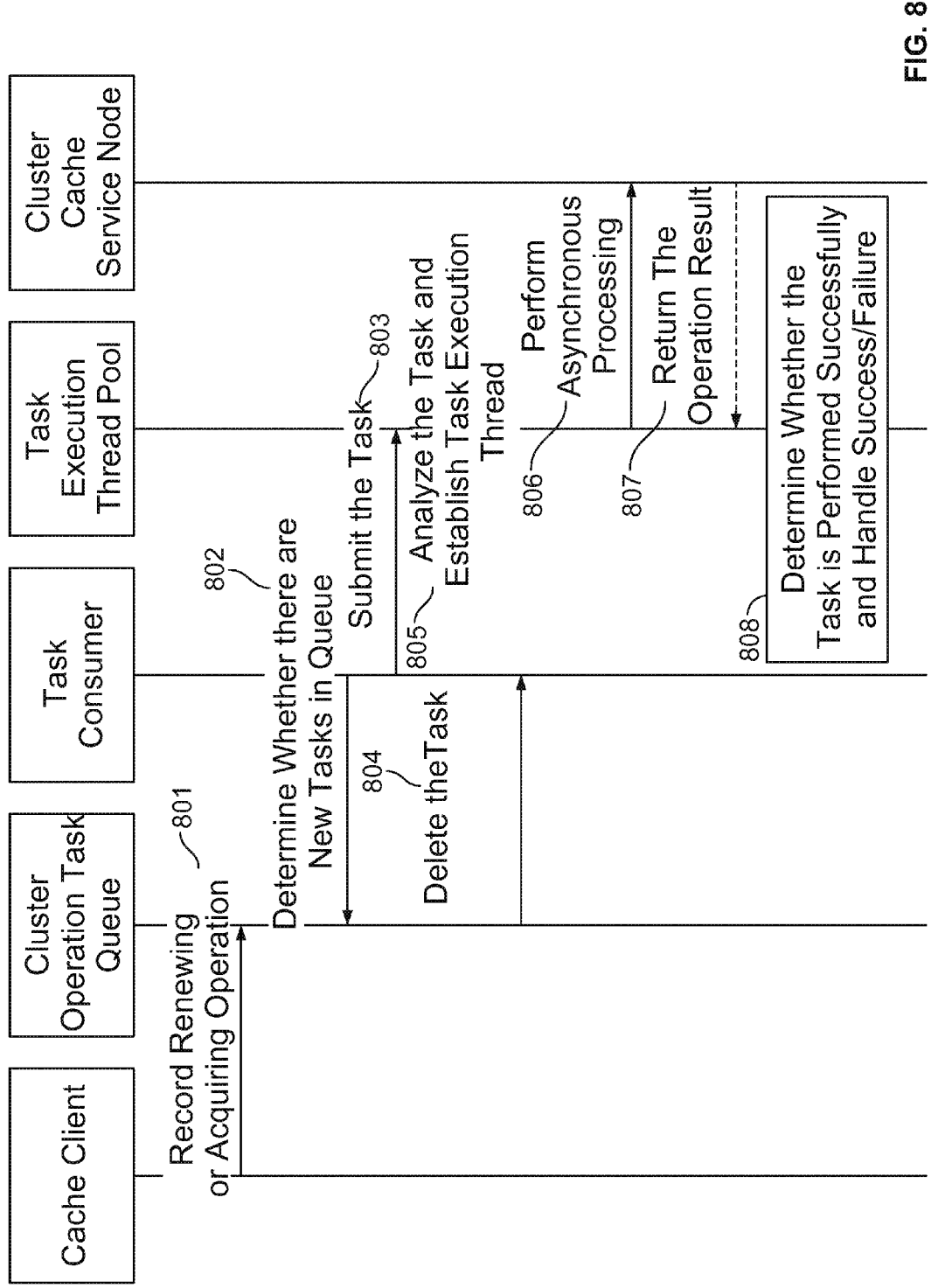
FIG. 8 is a flowchart illustrating an embodiment of a process for asynchronous processing.

FIG. 8 is a flowchart illustrating an embodiment of a process for asynchronous processing. In the example shown, data structures including a cluster operation task queue, a task consumer, and a task execution thread pool are used to facilitate the processing of requests by the cache client asynchronously.

At 801, the cache client records an operation to be performed by a cache service node in cluster operation task queue. The operation may be a renewing operation for renewing the cache service node as a master or an acquiring operation that requires cache data to be acquired.

At 802, the task consumer sends a message to the cluster operation task queue to inquire whether there are new tasks in the queue. If so, at 803, the task consumer sends the task to the task execution thread pool. Once the task is sent, the cluster operation task queue deletes the task at 804.

At 805, the task execution thread pool analyzes the task according to task order, task destination, and task content and establishes a task execution thread to process the task asynchronously.

At 806, the task execution thread pool uses the task execution thread to perform asynchronous processing. If the operation is an acquiring operation for acquiring cache content, the operation and its associated data is sent to the cluster. Oily the cache service node to which the operation is directed is allowed to perform the operation, while other cache service nodes are prevented from performing the operation.

When the operation is a renewing operation for renewing the failure state of the cache service nodes, the operation and its associated data is copied to the cluster. Only the cache service node to which the operation is directed is allowed to perform the operation, while other cache service nodes are prevented from performing the operation.

At 807, the cluster cache service node sends the result of the operation to the task execution thread pool.

At 808, the task execution thread pool determines whether the task is performed successfully according to the operation result and handled the result of the determination. Specifically, when the task failed, several ways to handle the failure may be carried out. For example, the task may be simply discarded, it may be retried a finite number of times, or the task may be temporarily stored and retried later.

Figure 9:
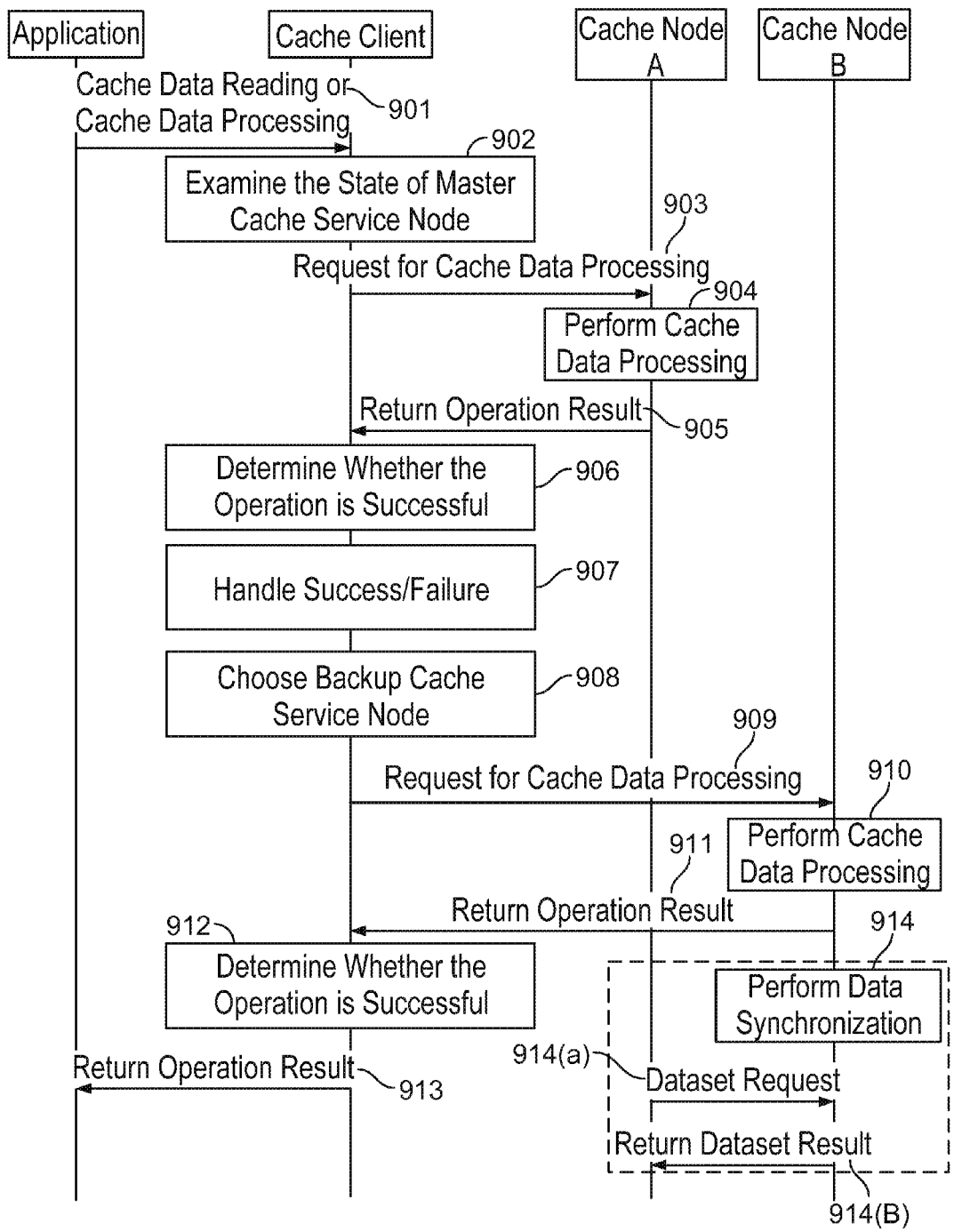
FIG. 9 is a flow diagram illustrating the messages and steps used in an embodiment of a cache data processing process in active configuration mode.

In some embodiments, the standby cluster configuration mode is applied in a system with low data security requirement and high reliability. The system includes an application, a cache client, cache nodes A, B, etc. When master cache service node cache node A fails to perform an operation, the cache client sends a request to backup cache service node cache node B, which performs cache data processing and performs data synchronization by itself. FIG. 9 is a flow diagram illustrating the messages and steps used in an embodiment of a cache data processing process in standby configuration mode.

At 901, an application sends request for cache data reading or cache data processing to a cache client.

At 902, the cache client receives the request sent by the application and examines the state of master cache service node cache node A in local cache. If the failure state has exceeded the validity time limitation, then the failure tag is removed.

If master cache service node has not failed, 903 is performed; else, 904 is performed. At 903, the cache client sends request for cache data processing to cache node A. At 904, cache node A receives the request for cache data processing sent by cache client, cache node A performs cache data processing.

At 905, after cache node A performs cache data processing, the operation result is returned to cache client. At 906, the cache client determines whether the operation is successful according to returned operation result. At 907, the cache client handles the success or failure of the operation. For example, the number of failures is incremented in a failure counter associated with the cache node, and compared with a threshold N. When the number of failures in the counter is greater than the threshold N, the cache client tags the state of cache node A with failure, and sets failure validity period. At 908, the cache client chooses one backup cache service node from available cache service nodes.

If a cache service node in a cluster failed, the cache service node maintains its failure tag. The cache client identifies available cache service nodes that are not tagged with failure state and chooses an available cache service node as backup cache service node. When cache client failed to find an available cache service node, the cache client sends error information to the application.

In this example, the diagram also illustrates a situation where the backup cache node B is selected as a substitute for master cache node A when A fails. 909-914 are performed accordingly.

When the former master cache service node A has recovered, it becomes a backup cache service node of the present master cache service node B. Thus, cache node A acts as the present backup cache service node and sends dataset request for asynchronous data synchronization processing to the present master cache service node B. Specifically, at 914 (*a*), cache node A sends dataset request to cache node B and at 914(*b*), cache node B returns dataset result to cache node A, so that data synchronization between cache node A and cache node B can be performed.

In some embodiments, in the standby cluster configuration mode, the cache client performs periodic heartbeat detection for cache service nodes in the cluster and periodically renews the state of cache service nodes with failure tag or without failure tag according to the result of heartbeat detection.

Figure 10:
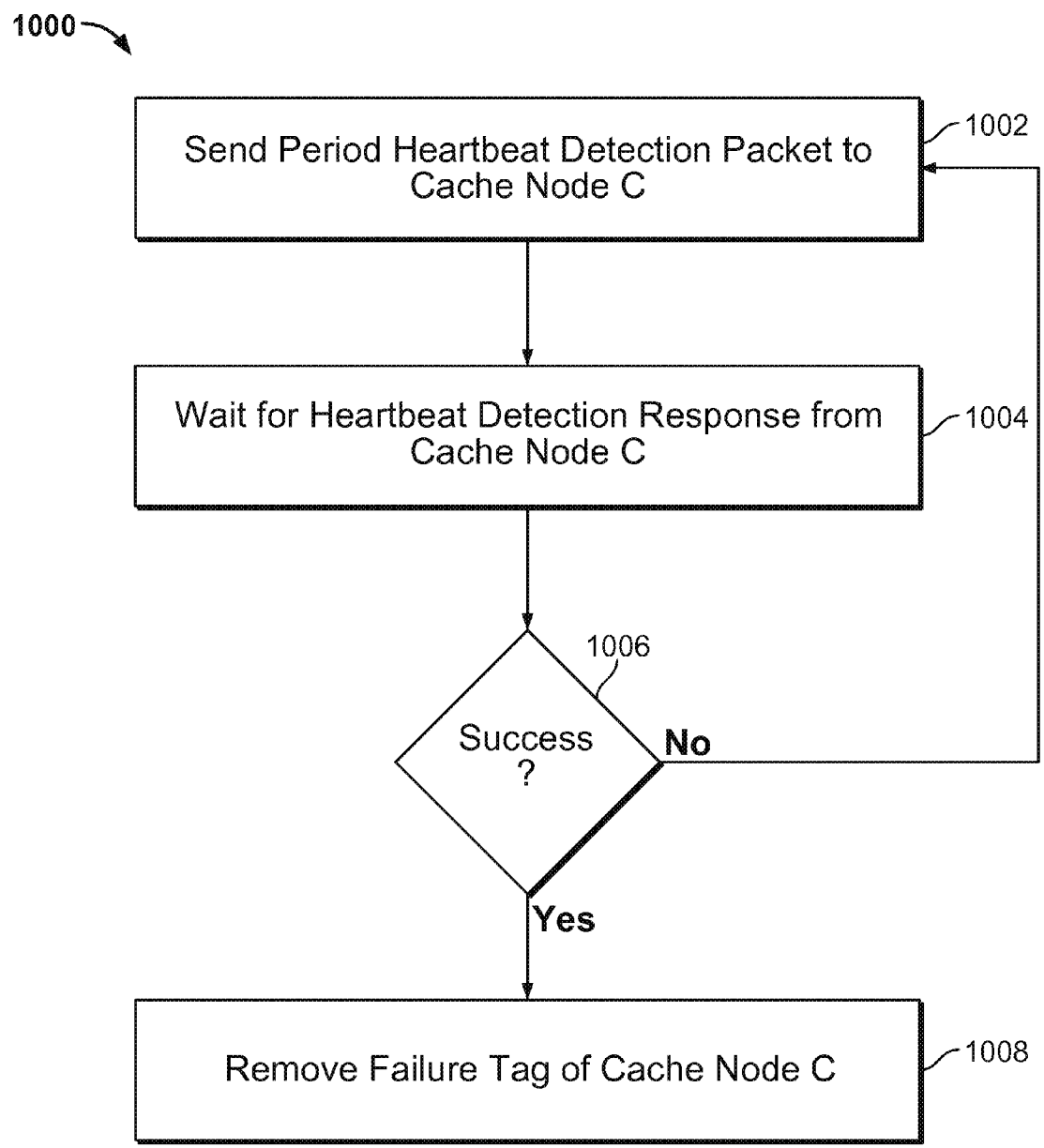
FIG. 10 is a flowchart illustrating an embodiment of a process for performing heartbeat detection on a cache service node that has been tagged with failure.

When a cache service node is associated with a failure tag, the cache client performs heartbeat detection for the cache service node, and when response number is greater than threshold, the cache client removes the failure tag of the cache service node. FIG. 10 is a flowchart illustrating an embodiment of a process for performing heartbeat detection on a cache service node that has been tagged with failure. In this example, due to previous failures, cache node C has been associated with a failure tag. At 1002, the cache client periodically sends heartbeat detection data to cache node C. At 1004, the cache client waits for a response from cache node C. At 1006, the cache client determines whether cache node C has responded successfully to the heartbeat data. Incorrect response code, incorrect checksum, or timeout of the response is construed as failure. At 1008, if cache node C responds to the heartbeat data successfully, then the failure tag associated with cache node C is removed.

Figure 11:
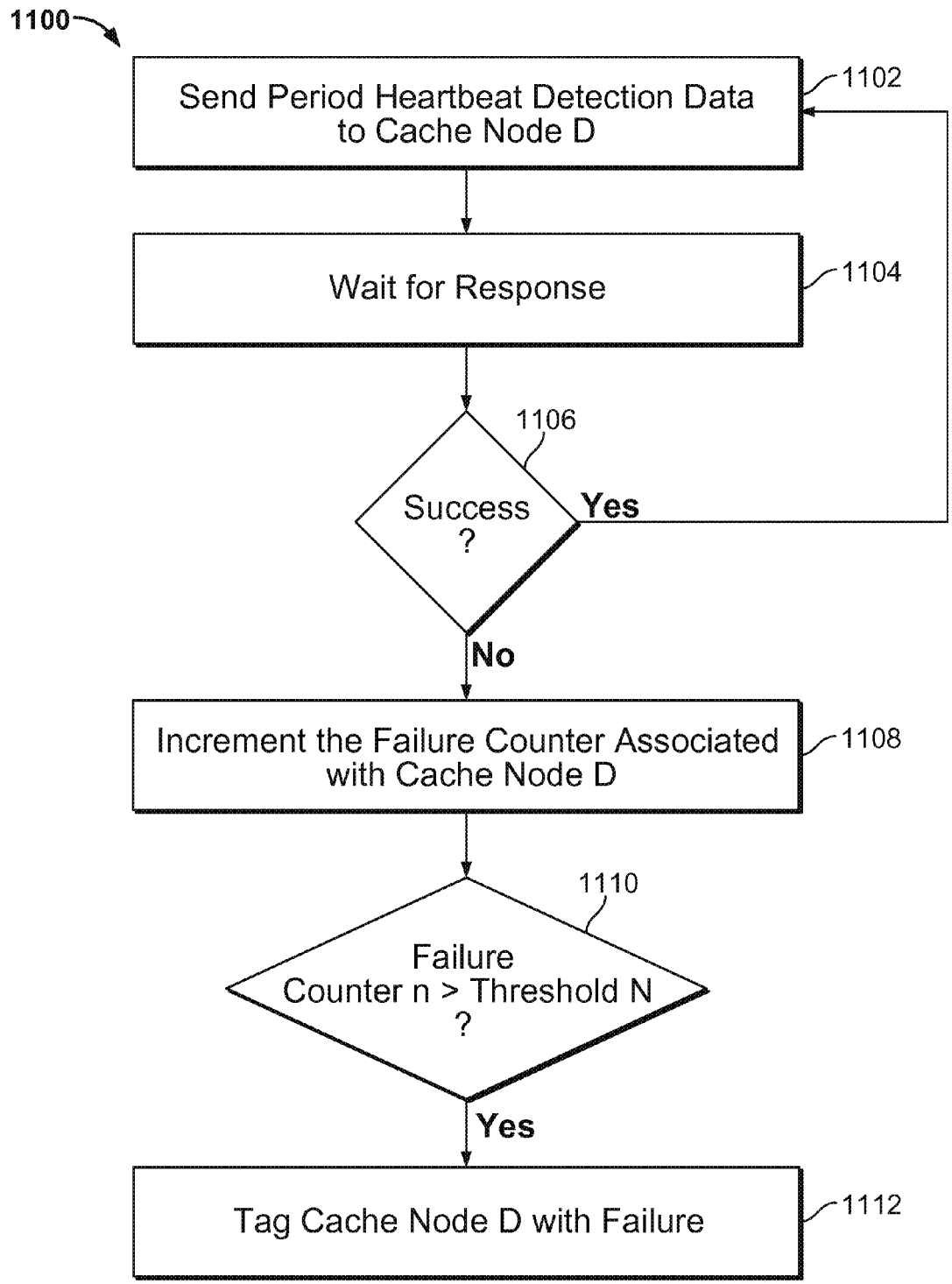
FIG. 11 is a flowchart illustrating an embodiment of a process for performing heartbeat detection on a cache service node that has not been tagged with failure.

The cache client also performs heartbeat detection on cache service nodes that are not tagged with failure and track the number of failures. FIG. 11 is a flowchart illustrating an embodiment of a process for performing heartbeat detection on a cache service node that has not been tagged with failure. In this example, cache node D is not currently associated with a failure tag. At 1102, cache client periodically sends heartbeat detection data to cache node D. At 1104, the cache client waits for a response from cache node D. At 1106, the cache client determines whether cache node D has responded successfully to the heartbeat data. Incorrect response code, incorrect checksum, or timeout of the response is construed as failure. If the response failed, at 1108, the failure counter associated with cache node D is incremented. At 1110, it is determined whether the value in the failure counter exceeds a threshold N. If so, cache node D is tagged with failure.

In some embodiments, a single failure counter is used for both when a cache service node fails to respond to heartbeat detection and when the cache service node fails to process cache request.

Figure 13:
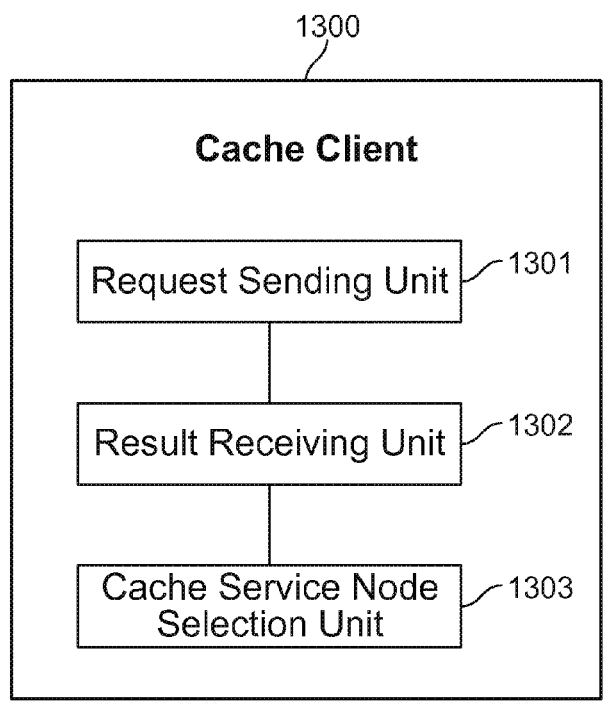
FIG. 13 is a block diagram illustrating an embodiment of a cache client.

FIG. 13 is a block diagram illustrating an embodiment of a cache client. In this example, the cache client includes a request sending unit 1301, used for sending operation request to master cache service node, when cache data needs to be operated on. Also included a result receiving unit 1302, used for receiving operation result of operation request sent by master cache service node to request sending unit 1301. Also included is a cache service node selection unit 1303. When it is determined, based on operation result received by the above described result receiving unit, that the above described master cache service node failed to perform cache data processing, the cache service node selection unit chooses one backup cache service node, and the request sending unit sends operation request to the chosen backup cache service node.

Figure 14:
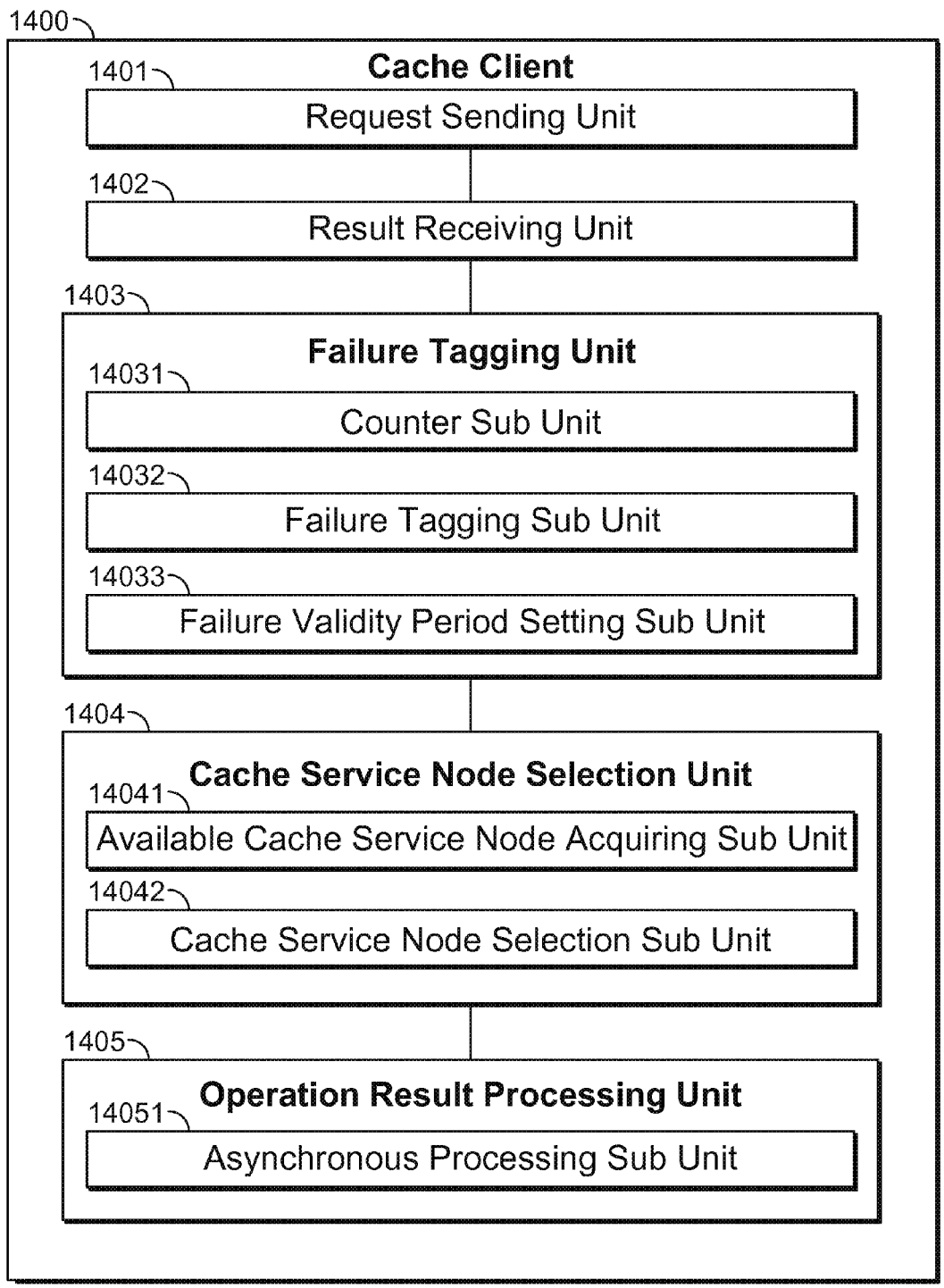
FIG. 14 is a block diagram illustrating a cache client that is in active cluster configuration mode.

FIG. 14 is a block diagram illustrating a cache client that is in active cluster configuration mode. Cache client 1400 shown in this example includes a request sending unit 1401, used for sending operation request to master cache service node when cache data needs to be processed, and a result receiving unit 1402, used for receiving operation result of operation request sent by master cache service node to the request sending unit 1402.

The cache client also includes a failure tagging unit 1403, used for tagging master cache service node with failure, when it is determined that the master cache service node failed to perform cache data processing according to operation result received by the result receiving unit 1402. The failure tagging unit 1403 includes a counter subunit 14031, used for incrementing the number of failures of cache client, when master service node failed to perform cache data processing; a failure tagging subunit 14032, used for comparing the number of failures accumulated by the counter subunit 14031 with a threshold and when the number of failures is greater than threshold, tagging master cache service node with failure; a failure validity period setting subunit 14033, used for setting the failure validity period of master cache service node, after the failure tagging subunit 14032 tagged master cache service node with failure.

The cache client also includes a cache service node selection unit 1404, used for choosing backup cache service node and sending operation request to backup cache service node. The cache service node selection unit 1404 includes an available cache service node acquiring subunit 14041, used for acquiring available cache service nodes in network according to cache service nodes tagged with failure by the failure tagging subunit; a cache service node choosing subunit 14042, used for choosing one cache service node as backup cache service node from available cache service nodes acquired by the available cache service node acquiring subunit 14041 according to appropriate techniques. The cache service node selection unit 1404 is also used for choosing master cache service node and the request sending unit 1401 sends operation request to the chosen master cache service node.

The request sending unit 1401 is also used for sending operation request to backup cache service node, when cache data needs to be operated on.

The result receiving unit 1402 is also used for receiving the operation result of operation request sent by the request sending unit 1401 to backup cache service node.

The failure tagging unit 1403 is also used for tagging backup cache service node with failure, when it judges that the operation failed according to operation result received by the result receiving unit 1402.

The cache client 1400 further includes an operation result processing unit 1405, used for performing according to the operation result of operation request from backup cache service node received by the result receiving unit 1402. The operation result processing unit 1405 includes an asynchronous processing subunit 14051, used for performing asynchronous processing for master cache service node, when judging that the operation is successful according to the operation result received by result receiving unit 1402 of cache client. The asynchronous processing subunit 14051 is used when the operation is successful and the operation is an acquiring operation, caching the operation result to cache client, and saving the operation and operation result in cluster operation task queue. The task execution thread pool returns the operation and operation content to cluster and prevents other cache service nodes from performing the operation. The asynchronous processing subunit is also used when the operation is successful and the operation is a renewing operation, saving the operation and operation result in cluster operation task queue. The task execution thread pool copies the operation and operation content to cluster and removes other cache service nodes from performing the operation.

Figure 15:
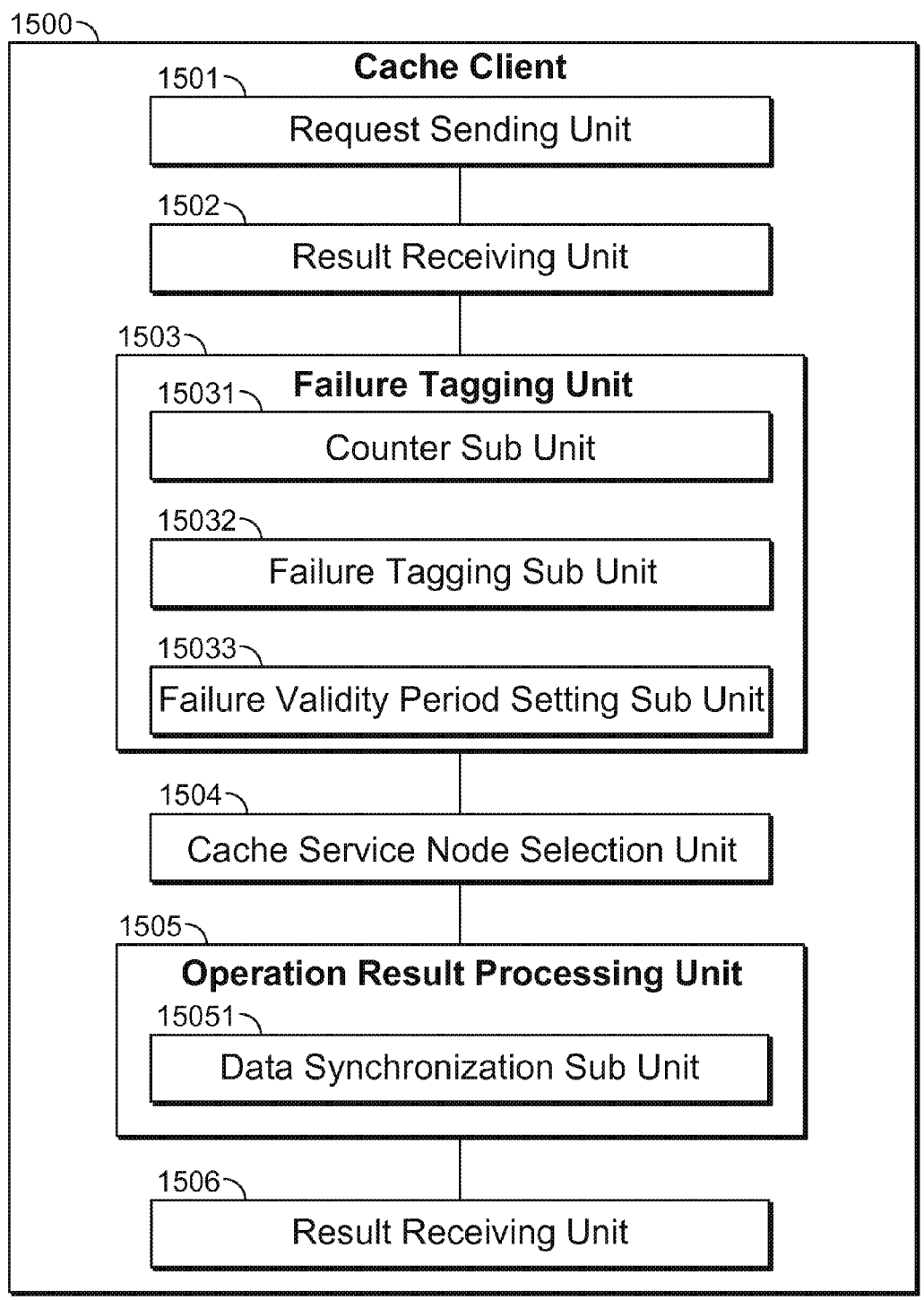
FIG. 15 is a block diagram illustrating a cache client that is in standby cluster configuration mode.

FIG. 15 is a block diagram illustrating a cache client that is in standby cluster configuration mode. Cache client 1500 shown in this example includes a request sending unit 1501, used for sending operation request to master cache service node, when cache data needs to be processed, and a result receiving unit 1502, used for receiving operation result of operation request from master cache service node sent by the request sending unit 1502.

The cache client further includes failure tagging unit 1503, used for tagging master cache service node with failure, when it judges according to operation result received by the result receiving unit 1502 that the master cache service node failed to perform cache data processing. Failure tagging unit 1503 includes a counter subunit 15031, used for accumulating the number of failures of cache client, when the master service node failed to perform cache data processing; a failure tagging subunit 15032, used for comparing the number of failures accumulated by the counter subunit 15031 with threshold and when the number of failures is greater than threshold, tagging master cache service node with failure; and a failure validity period setting subunit 15033, used for setting the failure validity period of master cache service node, after the failure tagging subunit 15032 tagged master cache service node with failure.

The cache client further includes a cache service node selection unit 1504, used for choosing backup cache service node and the request sending unit 1501 sending operation request to the chosen backup cache service node.

The request sending unit 1501 is also used for sending operation request to backup cache service node, when cache data needs to be operated on.

The result receiving unit 1502 is also used for receiving the operation result of operation request sent by backup cache service node to request sending unit 1501.

The failure tagging unit 1503 is also used for tagging backup cache service node with failure, when it judges that the operation failed according to operation result received by the result receiving unit 1502.

Cache client 1500 also includes an operation result processing unit 1505, used for performing according to the operation result of operation request from backup cache service node received by the result receiving unit 1502. The operation result processing unit 1505 includes a data synchronization subunit 15051, used for performing data synchronization for backup cache service node.

The cache client 1500 also includes a heartbeat detection unit 1506, used for performing heartbeat detection for master cache service node and backup cache service node, and renewing the failure state of master cache service node and/or backup cache service node according to the result of heartbeat detection.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The units may be implemented on a single device or distributed across multiple devices. The functions of the units may be merged into one another or further split into multiple subunits.

Figure 16:
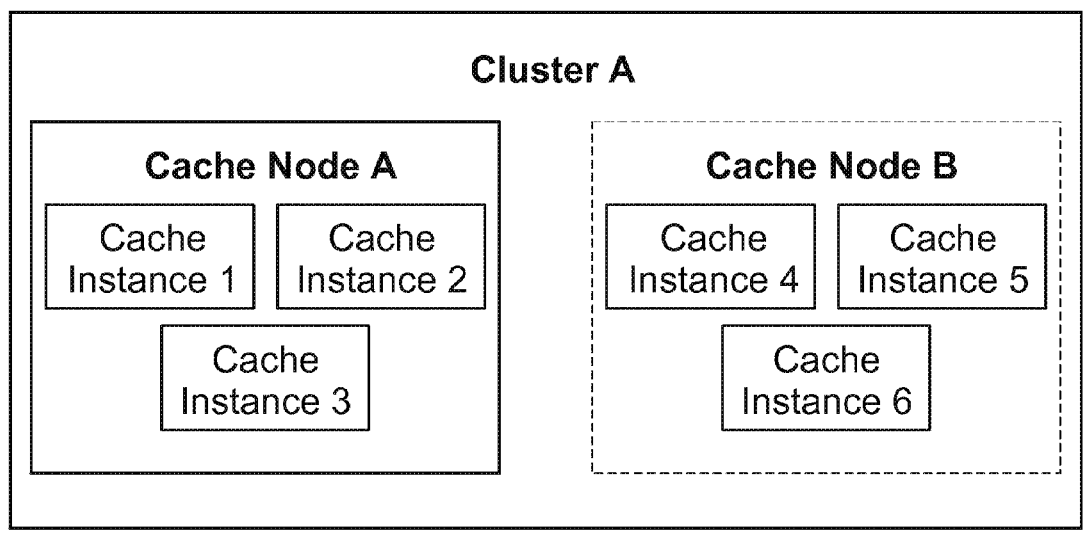
FIG. 16 is a diagram illustrating cache nodes capable of capacity expansion.

In some embodiments, when the capacity of cache service node in cluster is insufficient, node capacity expansion can be performed dynamically. For the centralized cache, in order to realize capacity expansion, cache node is configured as a virtual cache service node comprising multiple cache instances. FIG. 16 is a diagram illustrating cache nodes capable of capacity expansion. In the example shown, cluster A includes cache node A and cache node B. Cache node A includes cache instance 1, cache instance 2, and cache instance 3 and cache node B includes cache instance 4, cache instance 5, and cache instance 6. Those cache instances may be included in one server or distributed across several different servers. When the capacity of cache service node is insufficient, additional cache instance can be added to the virtual service node, thus improving the processing capacity and not affecting the usage of cache client.

However, when the number of cache instances changes, the hit rate of the cache may be affected. For example, suppose originally there are only 3 cache service nodes and a Hash technique is performed according to KEY and a Hash result is acquired. The number of cache service node modules is acquired according to the Hash result and finally determines the instance for saving or acquiring content. When the number of cache instances changes, the data saved originally may not be acquired normally. In a cluster configuration, data transferring can be realized in several ways. In some embodiments, a data transferring interface is provided by cache client, and the data of a cache service node in the cluster is transferred to other cache service nodes. For example, after performing capacity expansion for cache node A, the data can be transferred from cache node B to cache node A directly. Specifically, a cache client acquires all of the data in cache node B and then saves the data in cache node A. In some embodiments, automatic gradual data transfer is performed. With the active cluster configuration, after performing capacity expansion for cache node A, if the cache client does not have data, then it acquires data from other cache service nodes immediately. The cache client saves acquired data in cache node A according to the new technique. In this way, cache client gradually copies all saved data to cache node A.

By adopting cluster configuration mode, when master cache service node failed, backup cache service node is chosen for performing cache data processing. Therefore, the problems of cache service node unavailability and data loss as a result of cache service node's failure are solved and system reliability and availability are improved. Of course, a product that implements the application need not have all of the above described advantages at the same time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing cache data, comprising:
   querying, by a cache client, at least a subset of a plurality of cache service nodes of a cache cluster;
   selecting a master cache service node from the plurality of cache service nodes based at least in part on queried values corresponding to the master cache service node;
   sending, by the cache client, a cache processing request to the master cache service node, wherein the cache processing request includes an operation;
   receiving, by the cache client, a response from the master cache service node, wherein in the event that the response indicates that the master cache service node has failed to perform the operation associated with the cache processing request, incrementing a failure count associated with the master cache service node;
   determining whether the master cache service node has failed, wherein determining includes comparing the failure count associated with the master cache service node with a threshold and in the event that the failure count exceeds the threshold, determining that the master cache service node has failed; and
   in the event that the master cache service node has failed:
      selecting, by the cache client, a backup cache service node from the plurality of cache service nodes to perform the cache processing request;
      sending, by the cache client, the cache processing request to the backup cache service node, wherein a task execution thread pool prevents one or more cache service nodes from the plurality of cache service nodes other than the backup cache service node from performing the operation;
      receiving a successful operation result corresponding to the cache processing request from the backup cache service node; and
      in response to the successful operation result, storing, by the cache client, the operation and the successful operation result in a cluster operation task queue, wherein the operation and the operation result are to be copied from the cluster operation task queue to the master cache service node in the event that the master cache service node recovers from failure.

2. The method of claim 1, wherein in the event that the master cache service node has failed, further comprising associating the master cache service node with a failure tag.

3. The method of claim 1, wherein in the event that the master cache service node has failed, further comprising associating the master cache service node with a failure tag, and setting a failure validity period of the master cache service node.

4. The method of claim 1, wherein selecting the backup cache service node includes:
   identifying available cache service nodes in the cache cluster that are not marked with failure tags; and
   selecting the backup cache service node among the available cache service nodes.

5. The method of claim 1, wherein prior to sending the cache processing request to the master cache service node, the method further comprising:
   identifying each of the at least subset of the plurality of cache service nodes as being not marked with a failure tag.

6. The method of claim 1, wherein sending the cache processing request and waiting for the response are performed asynchronously.

7. The method of claim 1, wherein in the event that the master cache service node has failed, the method further comprising:
   performing heartbeat detection on the master cache service node; and
   in the event that the master cache service node continues to fail, renewing failure state of the master cache service node.

8. A caching system comprising:
   a cache cluster comprising a plurality of cache service nodes; and
   a cache client configured to:
      query at least a subset of the plurality of cache service nodes;
      select a master cache service node from the plurality of cache service nodes based at least in part on queried values corresponding to the master cache service node;
      send a cache processing request to the master cache service node, wherein the cache processing request includes an operation;
      receive a response from the master cache service node, wherein in the event that the response indicates that the master cache service node has failed to perform the operation associated with the cache processing request, increment a failure count associated with the master cache service node;
      determine whether the master cache service node has failed, wherein determining includes comparing the failure count associated with the master cache service node with a threshold and in the event that the failure count exceeds the threshold, determine that the master cache service node has failed; and
      in the event that the master cache service node has failed:
         select a backup cache service node from the plurality of cache service nodes to perform the cache processing request;
         send the cache processing request to the backup cache service node, wherein a task execution thread pool prevents one or more cache service nodes from the plurality of cache service nodes other than the backup cache service node from performing the operation;
         receive a successful operation result corresponding to the cache processing request from the backup cache service node; and
         in response to the successful operation result, store the operation and the successful operation result in a cluster operation task queue, wherein the operation and the operation result are to be copied from the cluster operation task queue to the master cache service node in the event that the master cache service node recovers from failure.

9. The system of claim 8, in the event that the master cache service node has failed, the cache client is further configured to cause the master cache service node to be associated with a failure tag.

10. The system of claim 8, in the event that the master cache service node has failed, the cache client is further configured to cause the master cache service node to be associated with a failure tag and a failure validity period.

11. The system of claim 8, wherein to select the backup cache service node includes to:
   identify available cache service nodes in the cache cluster that are not marked with failure tags; and
   select the backup cache service node among the available cache service nodes.

12. The system of claim 8, wherein prior to sending the cache processing request to the master cache service node, the cache client is further configured to:
   identify each of the at least subset of the plurality of cache service nodes as being not marked with a failure tag.

13. The system of claim 8, wherein sending the cache processing request and waiting for the response are performed asynchronously.

14. The system of claim 8, wherein in the event that the master cache service node has failed, the cache client is further configured to:
   perform heartbeat detection on the master cache service node; and
   in the event that the master cache service node continues to fail, renew failure state of the master cache service node.

15. The method of claim 1, wherein the cache cluster is configurable in a standby cluster configuration mode, wherein the master cache service node is the only node among the plurality of cache service nodes that is in a working state.

16. The system of claim 8, wherein the cache cluster is configurable in a standby cluster configuration mode, wherein the master cache service node is the only node among the plurality of cache service nodes that is in a working state.

* * * * *